US008873050B1

(12) United States Patent
Flock (10) Patent No.: US 8,873,050 B1
(45) Date of Patent: Oct. 28, 2014

(54) SELECTIVE DIFFRACTION WITH IN-SERIES GRATINGS (71) Applicant: KLA-Tencor Corporation, Milpitas, CA (US)

(72) Inventor: Klaus Flock, Sunnyvale, CA (US)

(73) Assignee: KLA-Tencor Corp., Milpitas, CA (US)

(*) Notice: Subject to any disclaimer, the term of this patent is extended or adjusted under 35 U.S.C. 154(b) by 0 days.

(21) Appl. No.: 13/969,470

(22) Filed: Aug. 16, 2013

Related U.S. Application Data (60) Provisional application No. 61/684,107, filed on Aug. 16, 2012.

(51) Int. Cl.
G01J 3/28 (2006.01)

(52) U.S. Cl.
CPC .......................................... G01J 3/28 (2013.01)
USPC .......................................................... 356/328

(58) Field of Classification Search
USPC ................................... 356/300, 326, 328, 334
See application file for complete search history.

(56) References Cited

U.S. PATENT DOCUMENTS

| 5,805,285 | A | 9/1998 | Johs et al. | |
|---|---|---|---|---|
| 5,943,122 | A | 8/1999 | Holmes | |
| 6,222,187 | B1 | 4/2001 | Shivanandan | |
| 6,744,505 | B1* | 6/2004 | Wang et al. | 356/326 |
| 7,061,614 | B2 | 6/2006 | Wang et al. | |
| 7,196,790 | B2 | 3/2007 | Cole | |
| 7,317,529 | B1 | 1/2008 | Liphardt et al. | |
| 7,760,342 | B2 | 7/2010 | Zanni et al. | |
| 7,933,026 | B2 | 4/2011 | Opsal et al. | |
| 7,990,549 | B2 | 8/2011 | Walsh | |
| 8,054,453 | B2 | 11/2011 | Harrison | |
| 2008/0309936 | A1* | 12/2008 | Krapu | 356/328 |
| 2009/0161092 | A1 | 6/2009 | Zanni et al. | |

OTHER PUBLICATIONS

"Choosing a Grating & Wavelength Range: 'USB' Optical Bench," Ocean Optics, Inc., downloaded from www.oceanoptics.com/Products/bench_grating_usb.asp on Aug. 23, 2012.
"UV-VIS-NIR Spectroscopy," BaySpec, Inc., downloaded from www.bayspec.com/product.php?a_id=14 on Aug. 23, 2012.
"AvaSpec Dual-channel Fiber Optic Spectrometers," Avantes Inc., downloaded from avantes.com/Spectrometers/.../Detailed-product-flyer.html on Aug. 23, 2012.
"UV-VIS Spectrophotometers—UV-3600—Shimadzu Scientific Instruments," Shimadzu Scientific Instruments, downloaded from www.ssi.shimadzu.com/products/product.cfm?product=uv3600 on Aug. 23, 2012.

* cited by examiner

Primary Examiner — Abdullahi Nur
(74) Attorney, Agent, or Firm — Ann Marie Mewherter (57) ABSTRACT Systems and methods for determining information for a wafer are provided. One system includes a first grating that diffracts light from a wafer having wavelengths in a first portion of a broadband range and does not diffract the light from the wafer having wavelengths in a second portion of the broadband range. The system also includes a second grating positioned in the path of the light that is not diffracted by the first grating. The second grating diffracts the light from the wafer having the wavelengths in the second portion of the broadband range. The system further includes a first detector configured to generate first output responsive to the light diffracted by the first grating and a second detector configured to generate second output responsive to the light diffracted by the second grating.

20 Claims, 4 Drawing Sheets

SELECTIVE DIFFRACTION WITH IN-SERIES GRATINGS

BACKGROUND OF THE INVENTION

1. Field of the Invention

The present invention generally relates to systems and methods for determining information for wafers using selective diffraction with in-series gratings.

2. Description of the Related Art

The following description and examples are not admitted to be prior art by virtue of their inclusion in this section.

Inspection and metrology processes are used at various steps during a semiconductor manufacturing process to detect defects on wafers and/or to measure one or more characteristics of the wafers to promote higher yield in the manufacturing process and thus higher profits. Inspection and metrology have always been important parts of fabricating semiconductor devices such as ICs. However, as the dimensions of semiconductor devices decrease, inspection and metrology become even more important to the successful manufacture of acceptable semiconductor devices because smaller defects and deviations can cause the devices to fail.

Some inspection and/or metrology systems include gratings or other dispersive elements in the detection portion of the systems that can separate the light from the wafer based on wavelength so that multiple measurements at multiple wavelengths may be performed simultaneously. The diffraction efficiency of an optical grating typically falls off to less than 10% when being operated relatively far away from its peak efficiency, which means that more than 90% of the available photons within a given system may be lost in that wavelength range. A work around for a system that requires high diffraction efficiency for both short and long wavelengths is to make two successive measurements with two independent spectrometers, which receive light from the same measurement path up to the entrance of such a dual spectrometer. A switching device such as a mirror that is flipped into and out of the beam then selects between measuring in the short wavelength spectrum or the long wavelength spectrum. A disadvantage of such a switching design is that throughput is reduced since the full spectrum measurements can only be acquired by making successive measurements.

Accordingly, it would be advantageous to develop methods and systems for determining information for wafers that do not have one or more disadvantages described above.

SUMMARY OF THE INVENTION

The following description of various embodiments is not to be construed in any way as limiting the subject matter of the appended claims.

One embodiment relates to a system configured to determine information for a wafer. The system includes an illumination subsystem configured to direct light having wavelengths in a broadband range to a wafer. The system also includes a first grating positioned in a path of the light from the wafer. The first grating diffracts the light from the wafer having wavelengths in a first portion of the broadband range and does not diffract the light from the wafer having wavelengths in a second portion of the broadband range. In addition, the system includes a second grating positioned in a path of the light that is not diffracted by the first grating. The second grating diffracts the light from the wafer having the wavelengths in the second portion of the broadband range. The system further includes a first detector configured to generate first output responsive to the light diffracted by the first grating and a second detector configured to generate second output responsive to the light diffracted by the second grating. The system also includes a computer subsystem configured to determine information for the wafer using the first and second output. The system may be further configured as described herein.

Another embodiment relates to a method for determining information for a wafer. The method includes directing light having wavelengths in a broadband range to a wafer. The method also includes diffracting the light from the wafer having wavelengths in a first portion of the broadband range with a first grating positioned in a path of the light from the wafer. The first grating does not diffract the light from the wafer having wavelengths in a second portion of the broadband range. The method further includes diffracting the light from the wafer having the wavelengths in the second portion of the broadband range with a second grating positioned in the path of the light that is not diffracted by the first grating. In addition, the method includes generating first output responsive to the light diffracted by the first grating and second output responsive to the light diffracted by the second grating. The method also includes determining information for the wafer using the first and second output.

Each of the steps of the method described above may be further performed as described herein. In addition, the method described above may include any other step(s) of any other method(s) described herein. Furthermore, the method described above may be performed by any of the systems described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

Figure 1:
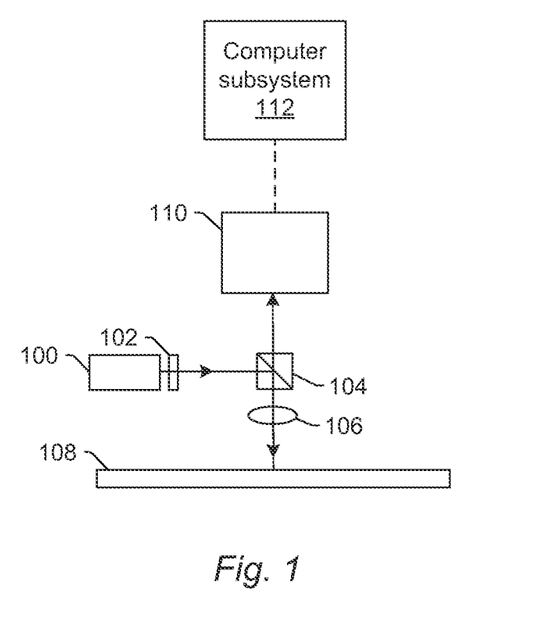
FIG. 1 is a schematic diagram illustrating a side view of one embodiment of a system for determining information for a wafer.

One embodiment relates to a system configured to determine information for a wafer. The system embodiments described herein can be used for optical metrology systems and applications, but may also be applied to inspection systems and applications. One embodiment of such a system is shown in FIG. 1. The system includes an illumination subsystem configured to direct light having wavelengths in a broadband (BB) range to a wafer. For example, as shown in FIG. 1, the illumination subsystem includes light source 100 configured to generate light. In one embodiment, the illumination subsystem includes a laser driven light source (LDLS) configured to generate the light. In some embodiments, the BB range includes wavelengths from 175 nm to 2000 nm. For example, the illumination subsystem may include a light source that produces a significant output from 175 nm to 2000 nm such as an LDLS.

The illumination subsystem may also include optical element 102 positioned in the path of the light from the light source. The optical element may include any suitable optical element such as a filter, a lens, or any other suitable optical element. Light from the optical element may be directed to beam splitter 104 that is configured to direct the light to optical element 106, which may include a lens that is configured to focus the light to wafer 108.

Light reflected, scattered, diffracted, or otherwise propagating from the wafer due to illumination may be collected by optical element 106, which directs the light through beam splitter 104 to detection subsystem 110. The detection subsystem may be further configured as described herein and shown in FIG. 2.

Figure 2:
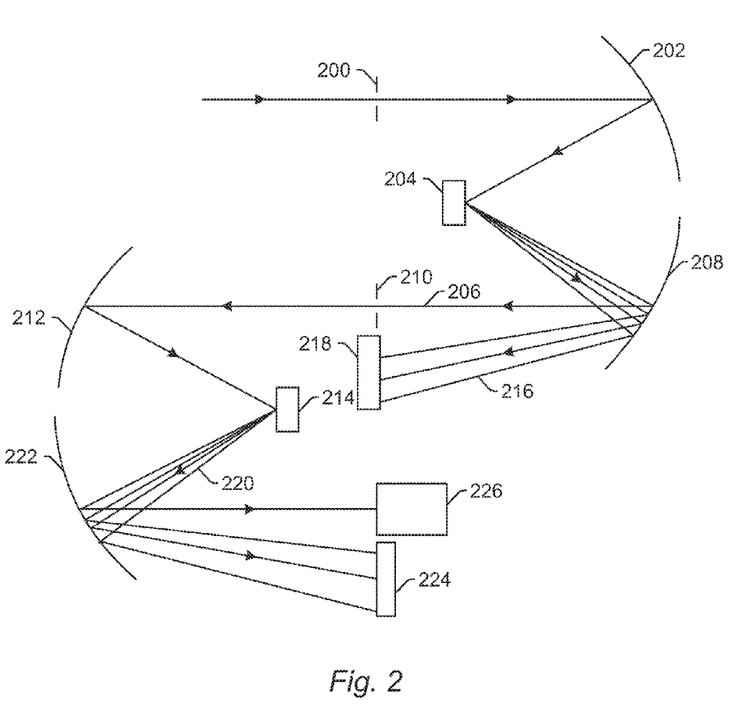
FIG. 2 is a schematic diagram illustrating a side view of one embodiment of a detection subsystem that may be included in the system embodiments described herein.

The system also includes a first grating in a path of the light from the wafer. For example, as shown in FIG. 2, the light from the wafer may be directed through entrance slit 200 to mirror 202, which reflects the light to first grating 204. The first grating diffracts the light from the wafer having wavelengths in a first portion of the BB range and may or may not diffract the light from the wafer having wavelengths in a second portion of the BB range with a preferred efficiency. The first grating may include any suitable dispersive element known in the art that may be configured as described herein.

In one embodiment, the first grating has a grating blaze angle that allows a high diffraction efficiency for the light from the wafer having the wavelengths in the first portion of the BB range and a low diffraction efficiency for the light from the wafer having the wavelengths in the second portion of the BB range. A high diffraction efficiency can be characterized as a diffraction efficiency above 90%, and a low diffraction efficiency can be characterized as a diffraction efficiency below 10%. The grating blaze angle of the first grating may be used to filter wavelength constituents out of a zero-order diffracted beam.

Figure 3:
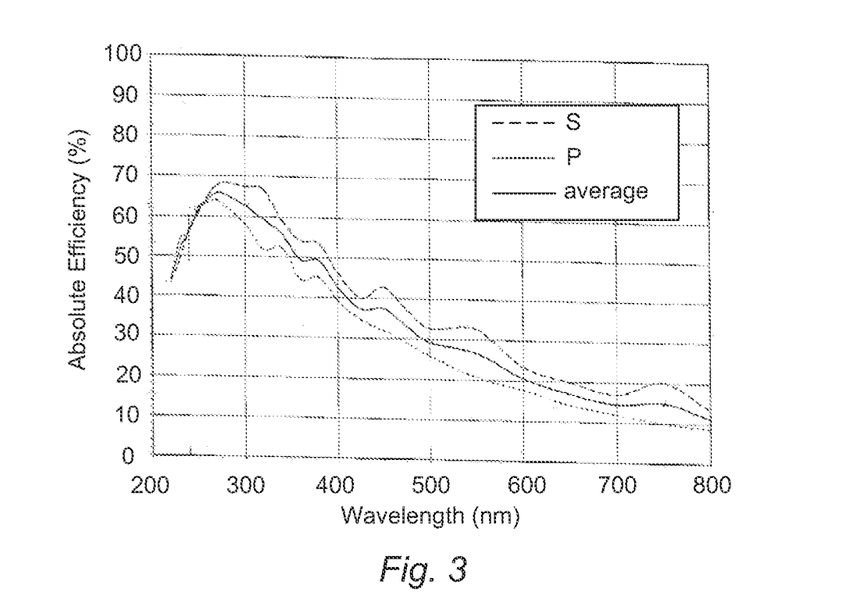
FIG. 3 is a plot of absolute efficiency as a function of wavelength for a broadband spectroscopic ellipsometric grating blazed for ultraviolet.

In another embodiment, the first portion of the BB range includes ultraviolet (UV) and visible (VIS) wavelengths. In some embodiments, the first grating has a peak diffraction efficiency in the UV or VIS wavelength range. For example, the first grating may have the best efficiency in a portion of the available spectrum of light, for instance, with a maximum diffraction efficiency at 280 nm (in the UV/VIS range). In one such example, as shown in FIG. 3, a BB spectroscopic ellipsometric (BBSE) grating, blazed for UV has a peak absolute diffraction efficiency of about 68% at about 280 nm. In some embodiments, the first portion of the BB range includes wavelengths from 175 nm to 850 nm. For example, the first grating can be used to efficiently filter out a first set of wavelengths, e.g., 175 nm to 850 nm, in a spectrometer design.

In another embodiment, the light that is not diffracted by the first grating includes a zero order light beam transmitted or reflected by the first grating. For example, the first grating may have a low diffraction efficiency for wavelengths far away from the maximum diffraction efficiency wavelength, meaning that other wavelength constituents of the incident beam do not undergo diffraction to the same extent and, for practical considerations, can be thought to specularly reflect at the grating surface or remain un-deviated for transmission gratings. This specularly reflected or un-deviated light constitutes the zero order of the first diffraction grating.

The system includes a second grating positioned in a path of the light that is not diffracted by the first grating. For example, as shown in FIG. 2, zero order light 206, which includes mostly near infrared (NIR) and infrared (IR) light, from the first grating may be reflected by mirror 208 through optional entrance slit 210 to mirror 212, which reflects the zero order light to second grating 214. The second grating diffracts the light from the wafer having the wavelengths in the second portion of the BB range. For example, zero order light from the first grating, now composed predominantly of longer wavelengths such as wavelengths in the NIR portion of the spectrum, may be dispersed by disposing a second grating along the beam of the zero order response of the first grating. In another embodiment, the second portion of the BB range includes NIR and IR wavelengths. In some embodiments, the second portion of the BB range includes wavelengths from 900 nm to 2000 nm. For example, when using a light source that produces a significant output from 175 nm to 2000 nm such as an LDLS, wavelengths greater than 900 nm may dominate the constituents of the zero order beam after the first diffraction. Therefore, the zero order light, now composed of mostly light in the IR spectrum, may be dispersed and may be available for spectral analysis, e.g., using a second grating.

Figure 4:
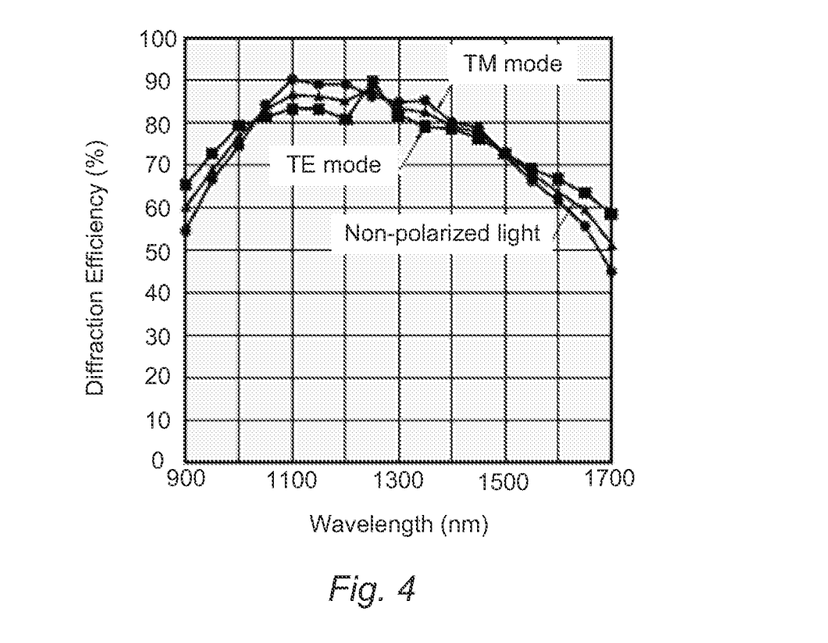
FIG. 4 is a plot of diffraction efficiency as a function of wavelength for a grating that is optimized for the near infrared.

The second grating may include any suitable dispersive element known in the art that can be configured as described herein. In one embodiment, the second grating has a peak diffraction efficiency in the NIR or IR wavelength range. In one such example, as shown in FIG. 4, a grating that is optimized for the NIR, e.g., for use in an IR SE system, may have a diffraction efficiency as a function of wavelength that peaks in the range of 1100 nm to 1250 nm. In this manner, the second grating, or some other dispersive element, may be optimized for wavelengths in the IR. For example, the second grating may be optimized for a wavelength of, say, 1200 nm (in the NIR).

Figure 5:
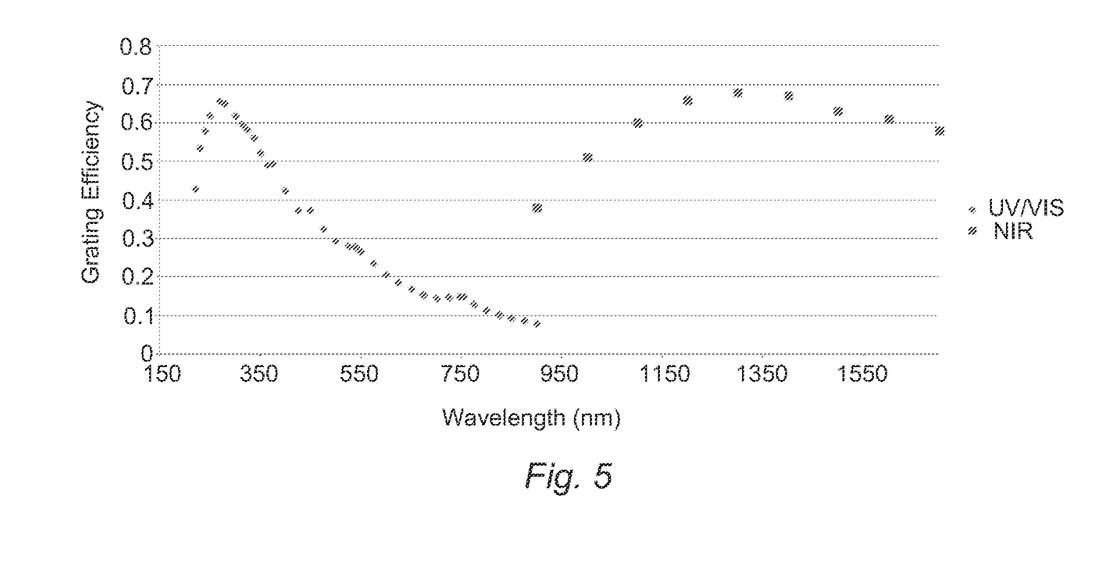
FIG. 5 is a plot of grating efficiency as a function of wavelength for two gratings.

In this manner, configurations for BB spectroscopy using two dispersive elements, such as optical gratings, arranged in series are described herein. The system may include diffraction gratings arranged in-series for extending the spectral range of parallel detection, for example, from UV to NIR. Furthermore, both portions of the spectral range are dispersed substantially simultaneously and with high diffraction efficiency across their respective wavelength range of detection. For example, as shown in FIG. 5, the efficiency curves for two gratings, one optimized for the UV/VIS and one optimized for the NIR, have been combined in one plot. The NIR grating in this plot is different than the example of FIG. 4. In this manner, the system embodiments described herein include a configuration of gratings arranged in series for loss-less, short- and long-pass wavelength filtering.

The system includes a first detector configured to generate first output responsive to the light diffracted by the first grating. For example, as shown in FIG. 2, light 216 diffracted by the first grating, such as first order diffracted light including mostly UV/VIS wavelengths, may be reflected by mirror 208 to first detector 218, which may include any suitable detector known in the art. Therefore, the first output may be responsive to mostly first order diffracted UV/VIS light. In one embodiment, the first grating and the first detector form a first spectrometer. For example, the first grating disperses a beam of light that is focused at spectrometer entrance slit 200 in some manner. The first order diffracted image of the entrance slit is re-imaged in the detector plane as in a spectrometer design.

In some embodiments, the first grating and the first detector form part of a first spectrometer having a configuration derived from a Czerny-Turner spectrometer, however, with a fixed grating and parallel BB detection, using a multi-channel detector. For example, the configuration of first grating 204 and first detector 218 in combination with mirrors 202 and 208 shown in FIG. 2 is similar to a Czerny-Turner configuration. However, the first spectrometer may have any other suitable configuration known in the art. Furthermore, the first spectrometer configuration may be similar to a Czerny-Turner configuration but may not be exactly a Czerny-Turner design. In general, the actual spectrometer configuration is of minor importance, as long as it is useful for the application and therefore may be selected based on the application for which the system will be used.

The system also includes a second detector configured to generate second output responsive to the light diffracted by the second grating. For example, as shown in FIG. 2, light 220 diffracted by second grating 214, which may include first order IR light, may be reflected by mirror 222 to second detector 224, which may include any suitable detector known in the art. The second output generated by the second detector may, therefore, be responsive to mostly first order diffracted IR light.

The wavelengths that have undergone zero order diffraction while interacting with a first grating followed by first order diffraction upon interaction with a second grating are available for analysis with a second spectrometer, part of which is formed by the second grating. For example, in one embodiment, the second grating and the second detector form a second spectrometer. In this manner, the light at the entrance of the second spectrometer (e.g., entrance slit 210) is dispersed in a second spectrometer configuration with a diffraction grating (second grating 214) that is optimized for a wavelength range that is complementary to that of the first grating of the first spectrometer. As such, the embodiments described herein are configured for simultaneous detection of a spectrum of light with two spectrometers, where a first spectrometer is optimized for a first range of wavelengths and where a second spectrometer is optimized for a second range of wavelengths.

In some embodiments, the second grating and the second detector form part of a second spectrometer having a configuration derived from a Czerny-Turner spectrometer. For example, the configuration of second grating 214 and second detector 224 in combination with mirrors 212 and 222 shown in FIG. 2 is derived from a Czerny-Turner configuration. However, the second spectrometer may have any other suitable configuration known in the art. Furthermore, like the first spectrometer configuration, the second spectrometer configuration may be similar to a Czerny-Turner configuration but may not be exactly a Czerny-Turner design. In general, the actual spectrometer configuration is of minor importance, as long as it is useful for the application and therefore may be selected based on the application for which the system will be used. Moreover, the first and second spectrometers may have the same configuration or different configurations.

In another embodiment, an entrance to the second spectrometer is located at the zero order slit image of the first spectrometer. For example, the image of entrance slit 200 after zero-order diffraction by the first grating may coincide with entrance slit 210 of the second spectrometer. In this manner, the zero-order diffracted spot can be sent to the second spectrometer, which can be done by placing the entrance to the second spectrometer at the location of the zero-order slit image of the first spectrometer.

The detection subsystem may also include optional detector 226, which may be configured to detect zero order light diffracted by the second grating. In this manner, this zero order detector may detect zero order residual UV/VIS light. Detector 226 may include any suitable detector known in the art.

In one embodiment, a beam splitter is not positioned in the path of the light between the first and second gratings. In an additional embodiment, a dichroic mirror is not positioned in the path of the light between the first and second gratings. For example, the embodiments described herein are configured for detection of a spectrum of light with two spectrometers that does not require splitting the beam with a transmissive optical component.

In another embodiment, a flipping mirror is not positioned in the path of the light between the first and second gratings. For example, the embodiments described herein are configured for detection of a spectrum of light with two spectrometers that does not require flipping a mirror into and out of the beam. In contrast, as described above, a work around for a system that requires high diffraction efficiency for both short and long wavelengths is to make two successive measurements with two independent spectrometers, which receive light from the same measurement path up to the entrance of the dual spectrometer. A switching device such as a mirror that is flipped into and out of the beam can then select between measuring a UV/VIS spectrum or an NIR spectrum. A disadvantage of such a switching design is that throughput is reduced since the full spectrum can only be acquired by making successive measurements. In other words, switching implies that spectra are measured consecutively, meaning that it takes longer, since full spectrum data is obtained by making two measurements.

The embodiments described herein eliminate this disadvantage and instead allow for substantially simultaneous operation of the UV/VIS and NIR spectrometers without introducing additional optical elements such as a beam splitter, switching mirror, dichroic filter, and so on. If the two spectrometers have similar acquisition times, the total measurement time is thereby cut in half compared to previously used dual spectrometer configurations. In addition, all optical considerations related to introducing an additional component into the beam path such as transmission loss, dispersion, ghost control, cost, rate of optical degradation, and so on can be eliminated by the embodiments described herein.

In another embodiment, the first and second gratings and the first and second detectors form a detection subsystem that does not include any moving elements. For example, the systems described herein allow for a dual spectrometer that is free of moving mechanisms yet does not require additional optical components in order to distribute the incoming light between a set of two spectrometers. Since a switching mechanism introduces mechanically moving components, all optomechanical considerations in terms of stability, reliability, cost, particle generation, mechanical engineering complexity, and so on can be eliminated by the embodiments described herein.

The system also includes a computer subsystem configured to determine information about the specimen (wafer) using the first and second output. For example, in the embodiment shown in FIG. 1, the system includes computer subsystem 112, which may be coupled to detectors of detection subsystem 110 (e.g., detectors 218, 224, and 226 shown in FIG. 2) by one or more transmission media shown in FIG. 1 by the dashed line, which may include "wired" and/or "wireless" transmission media, such that the computer subsystem can receive output generated by the detectors of the detection subsystem that is responsive to the detected light. The output of the detectors may include, for example, signals, images, data, image data, and the like.

The information content may be relevant for inspection applications, such as discovery of defects on the wafer, material discrimination, and defect classification, which can be determined in any suitable manner using any suitable method and/or algorithm known in the art. In the same manner, the information content may be relevant for optical metrology purposes, such as film thickness measurements, composition (n and k) measurements, and determination of critical dimensions (CD) of a patterned specimen. The information may include one or more of data, image data, images, and any other form in which such information can be output. The information may be stored in or output as an inspection results file, defect review results file, metrology results file, or any other measurement system results file.

In the field of semiconductor metrology, a metrology tool may include an illumination subsystem that illuminates a target, a collection or detection subsystem that captures relevant output provided by the illumination system's interaction (or lack thereof) with the target, and a computer subsystem that analyzes the output using one or more algorithms. Metrology tools can be used to measure structural and material characteristics (e.g., material composition, dimensional characteristics of structures and films such as film thickness and/or CD of structures, etc.) associated with various semiconductor fabrication processes. These measurements are used to facilitate process control and/or yield efficiencies in the manufacture of semiconductor devices.

The metrology tool may include one or more hardware configurations that may be used in conjunction with certain embodiments described herein, e.g., to measure the various aforementioned semiconductor structural and material characteristics. Examples of such hardware configurations include, but are not limited to, the following: SE, SE with multiple angles of illumination, SE measuring Mueller matrix elements (using rotating compensator(s)), BBSE, single wavelength ellipsometer, beam profile ellipsometer (angle-resolved ellipsometer), beam profile reflectometer (angle-resolved reflectometer), BB reflective spectrometer, and x-ray scatterometry (for example, based on small angle x-ray scattering (SAXS)).

The hardware configurations described above can be separated into discrete operational tools. On the other hand, one or more hardware configurations can be combined in a single tool. One example of such a combination of multiple hardware configurations into a single tool is shown in FIG. 1 of U.S. Pat. No. 7,933,026 issued on Apr. 26, 2011 to Opsal et al., which is incorporated by reference as if fully set forth herein. For example, as described in this patent, a metrology tool may include: a) a BBSE: b) an SE with a rotating compensator; c) a beam profile ellipsometer; d) a beam profile reflectometer; e) a BB reflective spectrometer, and f) a deep UV reflective spectrometer. In addition, a metrology tool typically includes numerous optical elements such as certain lenses, collimators, mirrors, quarter-wave plates, polarizers, detectors, cameras, apertures, and/or light sources. The wavelengths for such optical systems can vary from about 120 nm to 3 microns. For non-ellipsometric systems, the output generated by the system can be polarization-resolved or unpolarized.

As described above, the illumination subsystem of the system embodiments described herein is configured to direct light having wavelengths in a BB range to a wafer. Therefore, the illumination subsystem may include at least one light source that is configured to generate BB light. However, the illumination subsystem may include one or more light sources in addition to at least one BB light source such as those described further herein. In addition, if the system includes more than one hardware configuration, each hardware configuration may have its own illumination subsystem and light source or two or more hardware configurations may share an illumination subsystem and/or light source.

In this manner, one or more illumination subsystems of one or more hardware configurations included in the same tool may include one or more light sources such as a light source that generates light having only one wavelength (i.e., monochromatic light), light having a number of discrete wavelengths (i.e., polychromatic light), or light having multiple wavelengths (i.e., BB light). The light source(s) may include any suitable light source such as a white light source, a UV laser, an arc lamp, an electrodeless lamp, an LDLS such as those commercially available from Energetiq Technology, Inc., Woburn, Mass., a supercontinuum source (such as a BB laser source) such as those commercially available from NKT Photonics, Morganville, N.J., x-ray sources, extreme UV sources, or some combination thereof. The light source(s) may also be configured to provide light having sufficient brightness, which in some cases may be a brightness greater than about 1 W/(nm cm$^2$ Sr). The metrology system may also include a fast feedback to the light source for stabilizing its power and wavelength. Output of the light source can be delivered via free-space propagation or, in some cases, via optical fiber.

The metrology tool may be designed to make many different measurements related to semiconductor manufacturing. Certain embodiments described herein may be applicable to such measurements. For example, in certain embodiments, the tool may measure characteristics of one or more targets such as CDs, overlay, sidewall angles, film thicknesses, and process-related parameters (e.g., focus and/or dose). The targets can include certain regions of interest that are periodic in nature such as, for example, gratings in a memory die. Targets can include multiple layers (or films) whose thicknesses can be measured by the metrology tool. Targets can include target designs placed (or already existing) on the semiconductor wafer for use with, e.g., alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or differing times) by the same or multiple metrology tools. The data from such measurements may be combined.

Other measurement examples include measuring the composition of one or more layers of the semiconductor stack, measuring certain defects on (or within) the wafer, and measuring the amount of photolithographic radiation to which the wafer has been exposed.

The computer subsystem may also use a number of different algorithms to determine characteristic(s) of the wafer as described above such as an electro-magnetic (EM) solver, geometric engine; process modeling engine; data fitting; libraries: fast-reduced-order models: regression: AcuShape, machine-learning algorithms such as neural networks and support-vector machines (SVM); dimensionality-reduction algorithms such as principal component analysis (PCA), independent component analysis (ICA), and local-linear embedding (LLE); sparse representation such as Fourier or wavelet transform; Kalman filter; and algorithms to promote matching from the same or different tool types.

The computer subsystem may also be configured to use various algorithm(s) applicable to: measurement of CD, side wall angle, shape, stress, composition, films, bandgap, electrical properties, focus/dose, overlay, generating process parameters (e.g., resist state, partial pressure, temperature, focusing model), and/or any combination thereof; modeling and/or design of metrology systems; and modeling, design, and/or optimization of targets. The design of the algorithms may also be based on the following: computational hardware: architecture of computational hardware; parallelization; distribution of computation; load-balancing; multi-service support; and dynamic load optimization. In addition, the algorithms may be implemented in software, firmware, field programmable gate arrays (FPGA), and optics.

Computer subsystem 112 may take various forms, including a personal computer system, mainframe computer system, workstation, image computer, parallel processor, or any other device known in the art. In general, the term "computer subsystem" may be broadly defined to encompass any device having one or more processors, which executes instructions from a memory medium.

It is noted that FIGS. 1 and 2 are provided herein to generally illustrate some configurations of the system embodiments described herein. Obviously, the system configurations described herein may be altered to optimize the performance of the system as is normally performed when designing a commercial optical system. In addition, the systems described herein may be implemented using an existing optical system (e.g., by adding functionality described herein to an existing optical system) such as the products that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Each of the system embodiments described above may be configured to perform any step(s) of any method(s) described herein. In addition, each of the system embodiments described herein may be configured according to any other embodiments or systems described herein.

Another embodiment relates to a method for determining information for a wafer. The method includes directing light having wavelengths in a BB range to a wafer, which may be performed as described further herein. The method also includes diffracting the light from the wafer having wavelengths in a first portion of the BB range with a first grating positioned in a path of the light from the wafer, which may be performed as described further herein. The first grating does not diffract the light from the wafer having wavelengths in a second portion of the BB range. The first grating may be further configured as described herein. In addition, the method includes diffracting the light from the wafer having the wavelengths in the second portion of the BB range with a second grating positioned in the path of the light that is not diffracted by the first grating, which may be performed as described further herein. The second grating may be further configured as described herein. The method further includes generating first output responsive to the light diffracted by the first grating and second output responsive to the light diffracted by the second grating, which may be performed as described further herein. In addition, the method includes determining information for the wafer using the first and second output, which may be performed as described further herein.

Each of the embodiments of the method described above may include any other step(s) of any other method(s) described herein. In addition, each of the embodiments of the method described above may be performed by any of the systems described herein.

Further modifications and alternative embodiments of various aspects of the invention will be apparent to those skilled in the art in view of this description. For example, systems and methods for determining information for a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine information for a wafer, comprising:
   an illumination subsystem configured to direct light having wavelengths in a broadband range to a wafer;
   a first grating positioned in a path of the light from the wafer, wherein the first grating diffracts the light from the wafer having wavelengths in a first portion of the broadband range and does not diffract the light from the wafer having wavelengths in a second portion of the broadband range;
   a second grating positioned in the path of the light that is not diffracted by the first grating, wherein the second grating diffracts the light from the wafer having the wavelengths in the second portion of the broadband range, and wherein the first and second gratings are arranged in series;
   a first detector configured to generate first output responsive to the light diffracted by the first grating;
   a second detector configured to generate second output responsive to the light diffracted by the second grating; and
   a computer subsystem configured to determine information for the wafer using the first and second output.

2. The system of claim 1, wherein the illumination subsystem comprises a laser driven light source configured to generate the light.

3. The system of claim 1, wherein the broadband range comprises wavelengths from 175 nm to 2000 nm.

4. The system of claim 1, wherein the first grating has a grating blaze angle that allows a high diffraction efficiency for the light from the wafer having the wavelengths in the first portion of the broadband range and a low diffraction efficiency for the light from the wafer having the wavelengths in the second portion of the broadband range.

5. The system of claim 1, wherein the first grating has a peak diffraction efficiency in the ultraviolet or visible wavelength range.

6. The system of claim 1, wherein the first portion of the broadband range comprises ultraviolet and visible wavelengths.

7. The system of claim 1, wherein the first portion of the broadband range comprises wavelengths from 175 nm to 850 nm.

8. The system of claim 1, wherein the light that is not diffracted by the first grating comprises a zero order light beam transmitted or reflected by the first grating.

9. The system of claim 1, wherein the second grating has a peak diffraction efficiency in the near infrared or infrared wavelength range.

10. The system of claim 1, wherein the second portion of the broadband range comprises near infrared and infrared wavelengths.

11. The system of claim 1, wherein the second portion of the broadband range comprises wavelengths from 900 nm to 2000 nm.

12. The system of claim 1, wherein the first grating and the first detector form a first spectrometer, and wherein the second grating and the second detector form a second spectrometer.

13. The system of claim 1, wherein the first grating and the first detector form part of a first spectrometer having a configuration derived from a Czerny-Turner spectrometer.

14. The system of claim 1, wherein the second grating and the second detector form part of a second spectrometer having a configuration derived from a Czerny-Turner spectrometer.

15. The system of claim 1, wherein the first grating and the first detector form a first spectrometer, wherein the second grating and the second detector form a second spectrometer, and wherein an entrance to the second spectrometer is located at the zero order slit image of the first spectrometer.

16. The system of claim 1, wherein a beam splitter is not positioned in the path of the light between the first and second gratings.

17. The system of claim 1, wherein a flipping mirror is not positioned in the path of the light between the first and second gratings.

18. The system of claim 1, wherein a dichroic mirror is not positioned in the path of the light between the first and second gratings.

19. The system of claim 1, wherein the first and second gratings and the first and second detectors form a detection subsystem that does not comprise any moving elements.

20. A method for determining information for a wafer, comprising:

directing light having wavelengths in a broadband range to a wafer;

diffracting the light from the wafer having wavelengths in a first portion of the broadband range with a first grating positioned in a path of the light from the wafer, wherein the first grating does not diffract the light from the wafer having wavelengths in a second portion of the broadband range;

diffracting the light from the wafer having the wavelengths in the second portion of the broadband range with a second grating positioned in the path of the light that is not diffracted by the first grating;

generating first output responsive to the light diffracted by the first grating and second output responsive to the light diffracted by the second grating, wherein the and second gratings are arranged in series; and determining information for the wafer using the first and second output.

\* \* \* \* \*